July 13, 1965 A. F. GIORDANO 3,195,113

HIGH DENSITY DATA STORAGE SYSTEM

Filed Oct. 24, 1963 4 Sheets-Sheet 1

INVENTOR.
AMES F. GIORDANO
BY Charles Baraff
AGENT

INVENTOR.
AMES F. GIORDANO
BY Charles Baraff
AGENT

INVENTOR.
AMES F. GIORDANO
BY Charles Baraff
AGENT

INVENTOR.
AMES F. GIORDANO
BY Charles Baraff
AGENT

United States Patent Office 3,195,113
Patented July 13, 1965

3,195,113

HIGH DENSITY DATA STORAGE SYSTEM

Ames F. Giordano, Newark, N.J., assignor to International Telephone and Telegraph Corporation, Nutley, N.J., a corporation of Maryland Filed Oct. 24, 1963, Ser. No. 319,925
11 Claims. (Cl. 340—173)

This invention relates to data processing systems and more particularly to a serially scanned storage system for storing digital encoded information.

The present application is a continuation-in-part of my co-pending application Serial No. 811,759 filed May 7, 1959 now abandoned and concerns in particular an improvement over the photographic film storage system disclosed in the co-pending application of P. R. Adams et al., Serial No. 546,213, filed November 10, 1955, now Patent No. 3,144,637 which as to common subject matter in regard to disclosure is incorporated herein.

Various photographic storage systems are known, which utilize a cathode ray tube comprising a luminescent screen or target and a fine scanning electron beam for causing a phosphor screen to luminesce at discrete points. The electron beam is deflected by input signals to a particular discrete point of the screen, and the light emanating from a struck spot is focussed by a suitable optical system onto a photographic film for recording of information bits. A photodetector can be positioned so as to receive the light from the screen and to convert it into electrical output signals. Typical of such photographic storage systems are those referred to in an article "'Photographic Techniques for Information Storage" by King, Brown and Ridenour, Proceedings I.R.E., October 1953, pages 1421 to 1428. While such photographic systems provide a decided increase in speed of access to millions of bits of information as compared to other storage media such as magnetic recording tape, discs or wire systems, there is a further need for more rapid and accurate positioning of the beam.

A standing problem in photographic data storage systems is to accurately position the electron beam of the cathrode ray tube on the proper spots for writing and reading the information on millions of discrete areas. This operation must be performed repeatedly over long periods of time at high speed and within narrow tolerance limits.

Accordingly, it is an object of this invention to provide permanent storage of high density information bits on a photographic or like storage medium, in a relatively small space, but with simple, convenient and rapid access to the desired information.

Another object is to provide a data record carrying data and guide line indications thereon which are adapted to be serially scanned and which are arranged to provide scanning output signals from which feedback control signals can be extracted for use in precisely controlling the scanning process.

Another object of this invention is to accurately position a flying spot electron beam which is being modulated on and off in accordance with binary intelligence.

Another object of the invention is to shift the position of an intelligence-modulated flying-spot scanning beam from one line in a raster to which it is clamped to the next successive raster line.

In furtherance of the foregoing objects, a record produced in accordance with the present invention comprises binary intelligence deposited in a raster pattern formation, with the individual bits of intelligence arranged in what is commonly termed double-pulse form —i.e. at least two opposite pulse conditions are present in each bit storage position, and the actual intelligence is determined by the sequence of deposition of such pulse conditions—the ends of successive lines in the said pattern being interconnected by a continuous trace of a distinctive length which is large in relation to the space occupied by a single bit of intelligence. Such a record is adapted to be scanned, for example, by a flying spot scanning beam, and because of the distinctive pattern of lines of double-pulse intelligence and connecting traces, it is possible to scan the pattern and to derive from the output signals resulting from the scan, feedback control signals for controlling the position of the scanning beam, despite the presence of intelligence modulation on the said resulting output signals. This is accomplished by passing the said resulting output signals through a filter having a response characteristic such that signals due to the connecting traces pass through unaffected while those due to the higher frequency pulse variations in the double-pulse intelligence are passed through as a D.C. condition corresponding to the average signal energy within each line in said pattern. Thus, by virtue of the double-pulse arrangement, while the flying spot scanning beam is traversing an intelligence line, an average D.C. feedback control signal is produced which tends to clamp the beam to the line, and when the beam thereafter encounters a line-to-line connecting trace, a continuous feedback signal of like character is produced and serves to guide the beam to the next intelligence line.

A specific feature of the invention concerns the interposition of a ruled graticule in the path of an intelligence modulated flying spot beam, which is also impinging on both a photographic film record and a light-responsive feedback circuit. The form of the intelligence modulation and the design of the feedback circuit are such that the feedback circuit output is effective to clamp the beam to guide it along the graticule rulings independently of the signal fluctuations at the input thereof due to the intelligence modulation carried on the beam.

Another feature of the invention concerns the provision of read-out apparatus for sensing the above characterized data record, which includes a cathode ray tube, associated means for controlling the cathode ray beam to cause it to scan the said record in a coarse raster pattern which corresponds in a coarse sense to the pattern of deposition of intelligence on the record, and feedback means responsive to the condition of the scanning beam, after modulation thereof by the intelligence on the record, to produce feedback control signals for finely adjusting the position of the scanning beam, whereby the latter is made to traverse the record in a fine pattern corresponding identically to the pattern of intelligence and connecting traces on said record. The feedback means may conveniently include a photoelectric detector and a circuit for converting the detector output, which is an electrical signal modulated in accordance with the intelligence and connecting trace patterns on the record, into a demodulated control signal suitable for finely controlling the position of the scanning beam via application to the deflecting elements of the cathode ray tube.

Another feature of the invention involves the interposition of a tracking error correcting feedback circuit between the photoelectric detector and the cathode ray tube having a short time, constant circuit therein for line registration and a long time-constant circuit for maintaining raster position.

The above-mentioned and other features and objects of this invention will become more apparent by reference to the following description taken in conjunction with the accompanying drawings, in which.

Figures 1, 6:
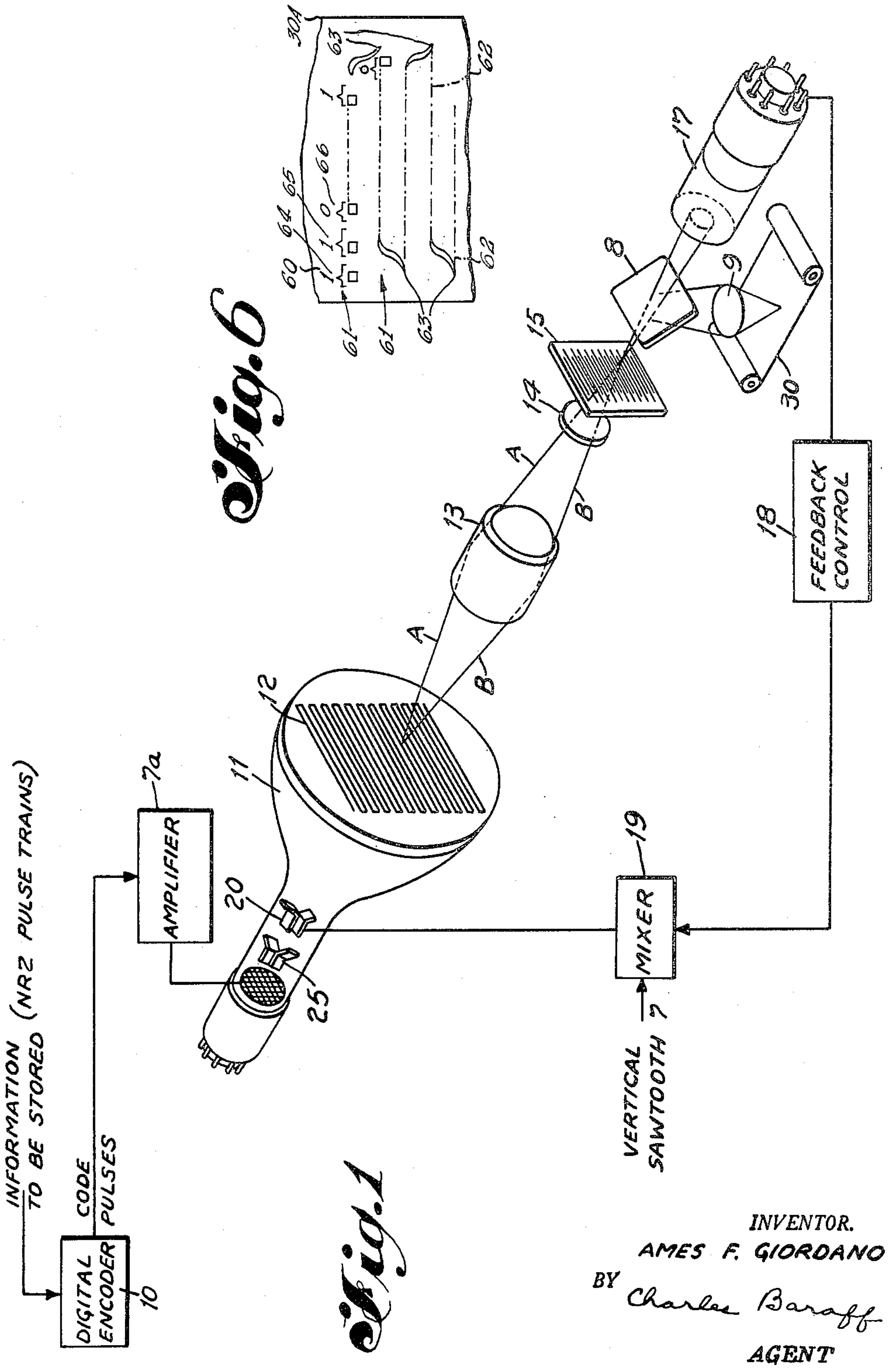
FIGURE 1 is a perspective view of an embodiment of the photographic recording system in accordance with the invention.
FIGURE 6 is a diagram schematically illustrating a typical pattern of recorded lines of intelligence and connecting traces produced by the apparatus of FIGURE 1 and adapted to be read out by the apparatus of FIGURE 4.

In FIGURE 1 of the drawings, a simplified schematic of one embodiment of the recording system for the high density photographic storage system of the invention is illustrated, wherein the vertical C.R. deflection circuits are shown and the horizontal deflection circuits are omitted.

Referring to FIGURE 1, there is shown a cathode ray tube 11 upon the face of which the path pattern or raster 12 of a positioned cathode ray beam is illustrated. A primary lens 13 is shown disposed in the path of the light emitted at discrete spots where the scanning beam of the cathode ray tube 11 strikes the luminescent screen. A second lens 14 acting as a field lens is disposed to intercept and direct the light rays from the lens 13 onto a graticule 15 which consists of opaque, ruled guide lines. The graticule 15 is placed close to the lens 14 at a point slightly removed from the image plane of the lens 13 but yet at a point where the light rays A—A and B—B from lens 13 intersect. The photomultiplier tube 17 is placed with its face in the image plane of the lens 14 and disposed so as to receive only a portion of the light from the exit aperture of the primary lens 13. Coupled to the photomultiplier 17 is a feedback control circuit 18 which in turn is coupled to a mixing network 19. A source of vertical saw-tooth wave signals 7 is also connected to the mixing circuit 19, the output of which is coupled to the vertical deflection plates 20 of the cathode ray tube 11.

Figure 2:
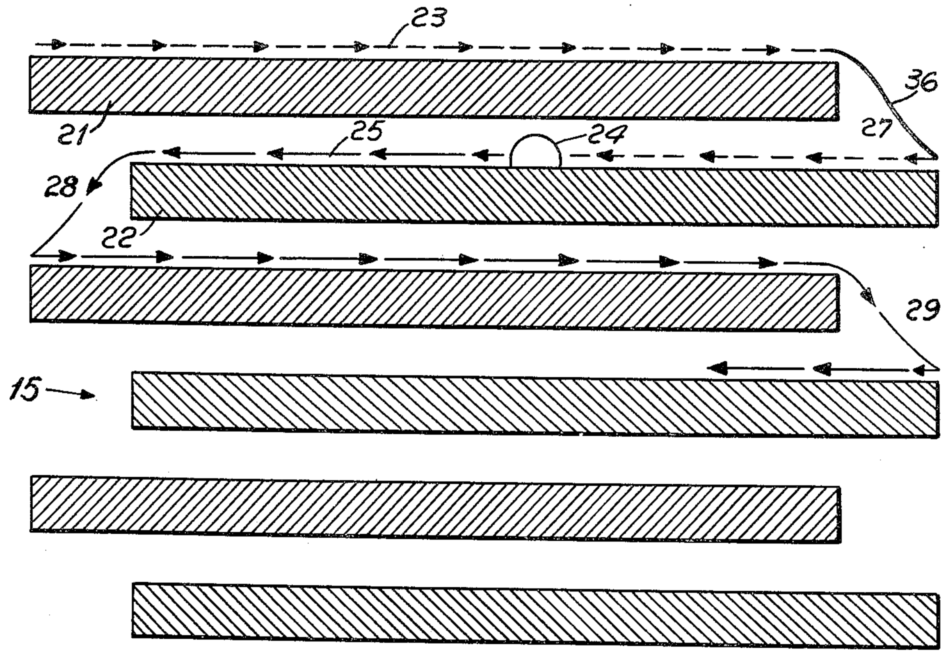
FIGURE 2 is an explanatory diagram of the path of a light spot as seen through the rear of the graticule.

Referring to FIGURE 2, there is shown the path of the light spot as seen through the rear of the graticule 15. The graticule has typically 300 parallel guide lines, for example, such as those shown by the opaque, ruled lines 21 and 22 having their respective ends relatively extended to provide gaps 27, 28, 29. The dashed line 23 shows the path that the positioned scanning cathode ray beam follows. The spot 24 is shown partly hidden by the opaque line 22, this being the normal position of the spot in its travel along the paths 23 and 25.

The recording system of FIGURE 1 must perform two essential functions. The first function requires the exposure of photographic film in response to code pulses, and the second requires the proper control of the light beam position in order to assure that the code pulses exposed are propedly located in a perfectly regular pattern on the photographic film.

Referring back to FIGURE 1, a traveling spot of light displayed on the cathode ray tube 11 as the writing beam is optically focused on the recording film 30 by an optical system 8, 9 comprising a half-silvered mirror and lens as disclosed in the aforementioned P. R. Adams et al. application. This provides a high-speed photographic recording of information bits on the film 30.

As the electron beam is deflected horizontally, the input information bits from the digital encoder 10 modulate the spot through the amplifier 7*a* "on" and "off" as required for the particular binary code group being recorded. Thus, the film 30 is exposed "black" and "white" according to the code, allowing wide latitude in exposure time and intensity. The film 30 is developed and reversed with the exposed areas translucent for the read-out operation described below. The purpose of the graticule arrangement and the feedback is to control the read-out whereby the lines of information of the film are tracked accurately regardless of small amounts of shrinkage or distortion due to developing processes or aging of the film or slight irregularities occurring during the recording.

The photomultiplier 17 is placed so as to "see" exactly what the film "sees." The graticule 15 has typically 300 opaque horizontal lines with equal clear spaces therebetween. The photocell 17 will see the writing spot through the graticule, and its output amplitude will be proportional to the unobscured area of the writing spot.

After amplification, the photocell output is fed back through the feedback control circuit 18 to the cathode ray tube 11 as an error correcting vertical signal, with a polarity such that more or less light to the photocell 17 tends to move the spot down or up, respectively. The spot will then be clamped to the upper edge of the opaque graticule ruling as illustrated in FIGURE 2. Any disturbance tending to move the spot upwards further into the clear area results in more light to the photocell 17 and the amplified output thereupon deflects the spot downward. The converse action occurs for a disturbance tending to move the spot downward behind the opaque ruling. As a net result, the spot is very tightly clamped to the upper edge of the guide lines 21, 22 (FIGURE 2).

Thus far, means have been described for reliably clamping the cathode ray spot to horizontal guide lines 21, 22. That this can be accomplished despite the presence of intelligence modulation on the spot will be explained hereinafter, and the construction of the feedback circuit required to do so will also be explained below. The technique by means of which the spot is caused to advance downward from line-to-line will be described with reference to the end gaps 27, 28, 29 formed by the alternate extensions at the ends of the guide lines 21, 22 shown in FIGURE 2.

An independent horizontal deflection field is introduced into the cathode ray tube by the horizontal deflecting plates 25 such that the field deflects the beam with linear velocity from left to right and then from right to left on the face of the cathode ray tube in the scanning pattern shown in FIGURE 1. If an additional downward force on the beam, independent of the vertical feedback signal, is applied as described below, then as the spot is guided by the first graticule line 21 horizontally, it will be found that the spot will drop down and clamp to the next lower guide line 22 due principally to the fact that a gap or break 27 occurs at the end of the opaque graticule guide line 21 as is apparent from FIGURE 2. The horizontal field then moves the spot along the second line 22 back to the left side and then down to the third line and so on for the 300 lines of the graticule pattern. After the 300th line is completed, the electron beam is blanked off in a well-known manner and returned to the top of the raster to begin sweeping along the first line again to repeat the cycle described.

It should be particularly noted that, because the flying spot is referenced to the upper edge of the graticule guide lines 21, 22, when it arrives at the end of a guide line, a gap or break occurs and the spot seeks its normal, uneclipsed position in the downward direction. The next lower guide line 22 is extended out so as to intercept the downward moving spot, which becomes partially eclipsed to the extent required to reduce the photocell output voltage to the value corresponding to that line's position. Normally, the system is adjusted so that the uneclipsed spot generates a photocell output sufficient to move the spot downwards several lines, that is, if the opaque guide lines were not present. An independent linear vertical deflection potential is mixed with the feedback photocell signal so as to deflect the spot downwards as the guide lines are scanned and thus insures that the spot is always tightly clamped to the reference lines.

Figures 3, 3A:
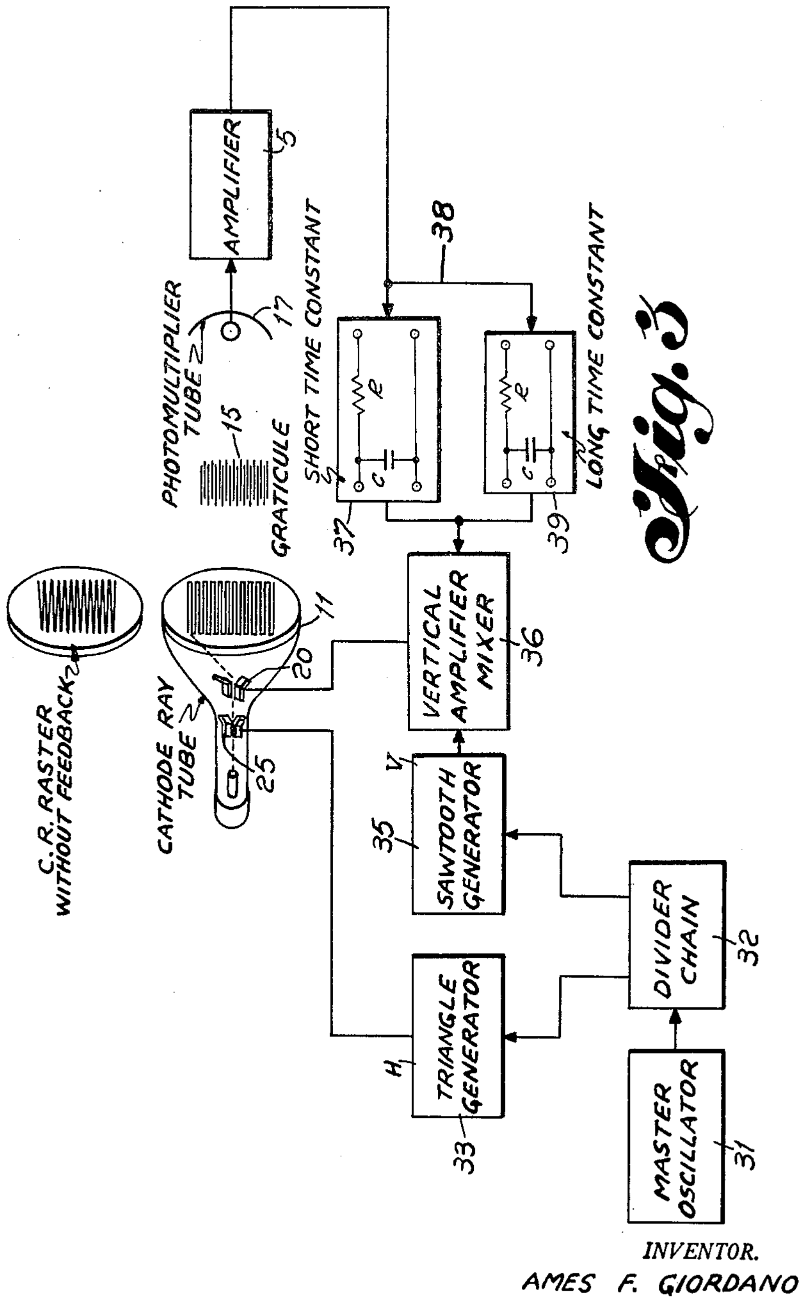
FIGURE 3 is a schematic diagram of the photographic recording system of FIGURE 1, including the cathode ray feedback circuits and the cathode ray tube deflecting circuits.
FIGURE 3A is a graph of the deflecting waveforms without feedback.

Referring to FIGURE 3, the schematic shows the recording portion of the high density photographic storage system of the invention in fuller detail with respect to the cathode ray deflection circuits and the feedback control.

The information to be recorded in binary code is coupled from an information source to an encoding circuit as previously described, where it is converted into a plurality of binary code pulses, the output of the encoding circuit being connected to the intensity modulation controls of the CRT 11 (FIGURE 1).

A master oscillator 31, which operates at the horizontal line sweep rate, has its frequency divided by a convenient multiple, in a conventional cascaded binary divider chain 32 to obtain the vertical beam deflection rate. The master oscillator 31 and divider chain 32 may use vacuum tubes or transistors.

The triangle wave generator 33 produces a linear triangular wave at the master oscillator frequency which is coupled to the CRT horizontal deflection plates 25 to deflect the cathode ray beam horizontally.

The vertical deflection generator 35 is a sawtooth oscillator at the "divided-down" frequency, which is applied to the vertical deflection plates 20 of the cathode ray tube 11. Its fly-back interval is adjustable and is normally set equal to about one horizontal line period, provision being made for blanking the cathode ray tube during this time in a well-known manner.

The raster resulting from the combination of horizontal and vertical deflection waveforms before the application of a corrective feedback or additional time constant is illustrated in FIGURE 3A.

The vertical sawtooth waveform is fed to one input of a mixer amplifier 36. The sawtooth output of amplifier 36 is modified by an error corrective signal derived from the photomultiplier tube 17 and fed back along path 38 to the mixer amplifier 36 and vertical CRT deflecting plates 20.

The feedback path 38 consists of two parallel paths 37, 39 respectively one being a high frequency path 37 containing an RC circuit of short time constant for controlling line-to-line registration and the other being a low frequency path 39 containing an RC circuit of long time constant for controlling and maintaining the raster position.

The high frequency path 37 for line registration is A.C. coupled and has a comparatively fast response time such that the electron beam falls to the next line during the short interval provided at line ends, yet not so fast that beam deflection occurs during periods of intensity blanking caused by digital read-in and read-out. Both the time constant and gain of these feedback paths may be made adjustable.

The low frequency feedback path 39 provides a high degree of long term stability to compensate for drifts in amplifiers, gain of the photomultiplier tube, intensity of the beam, etc. Its RC network is combined with a low pass filter so that it performs none of the line-to-line control assigned to the high frequency path 37. A peak detector can be employed in feedback path 39, so that the output is essentially independent of electron beam intensity modulation during the recording of digital information.

The maximum response of the low frequency loop is set to the desired value by adjusting the shunt capacitance of the RC circuit to the upper end of its range, so that only very long term changes in the raster will change the output of this feedback path.

Figure 4:
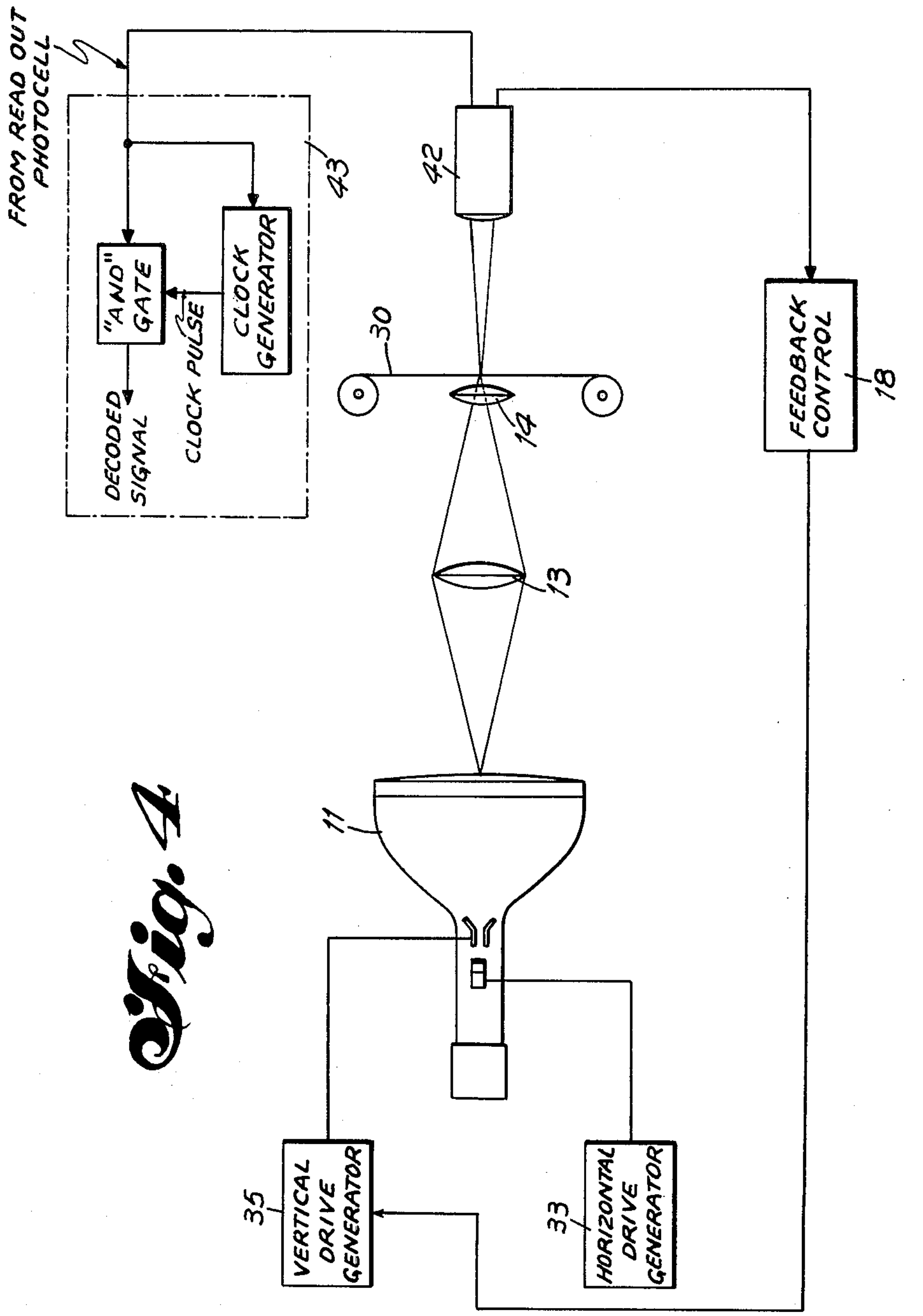
FIGURE 4 is a schematic diagram of the read-out section of the data storage system of this invention.

Referring to FIGURE 4, one embodiment of a read-out or data storage reproducing system in accordance with the principles of this invention is shown.

In the read-out system of FIGURE 4, the graticule is replaced by the photographic film record 30, and the output of the photocell 42 is fed to a read-out utilization device, such as a decoder circuit 43. The flying spot of the cathode ray tube 11 then tracks the recorded lines of digital information on film 30 which serve as guide lines. The cathode ray deflection and feedback control circuits are essentially similar to those shown in FIGURES 1 and 2. Since during recording the spot remains "on" at the end of each line a track 36, FIGURE 2, is exposed on the film which is later used during read-out as means for guiding the beam to the next line. The track 36 is transparent on the developed film 30.

During read-out, the spot size is made smaller, preferably by a factor of two, than during recording. This is accomplished by reducing the beam current of the cathode ray tube 11. The purpose in reducing the spot size during read-out is to insure the reliable tracking of the lower edge of a recorded line.

Figure 5:
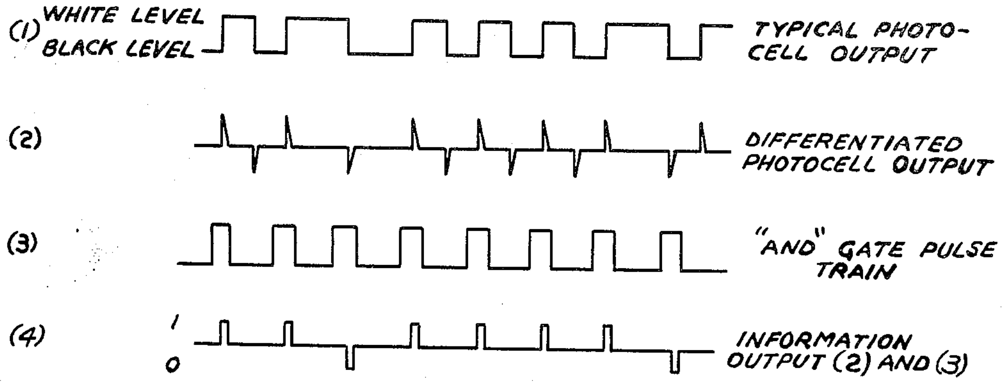
FIGURE 5 shows typical waveforms of the read-out and decoding circuits.

FIGURE 5 shows typical waveforms developed in the operation of the photographic storage system. In FIGURE 5, waveform 1 shows the photocell output when reading out a recording made by the NRZ (non-return-to-zero) method commonly known as double pulse or phase modulation recording, where a black-to-white transition represents a binary "one" and a white-to-black transition represents a bianry "zero." Waveform 2 is obtained by differentiation of waveform 1 and contains at least one pulse coinciding in time with each "one" or "zero." Thus, these pulses at the bit rate are used to control the timing of the "AND" gate pulse generator or "clock pulse generator" of the decoder circuit. The output of the "AND" gate pulse generators is shown in waveform 3.

When waveforms 1 and 3 are the inputs to an "AND" gate, then waveform 4 represents the desired output information.

As mentioned above, the digital information is recorded by the double pulse "non-return-to-zero" recording method; that is, a binary one is a black-to-white transition and a "zero" is a white-to-black transition. The double pulse method of recording provides an essential advantage in that, in a period equal to two black spaces in the recording information, there are signal components at the bit rate and twice the bit rate. This permits continuous electro-optical feedback control and allows a continuous correction of the read-out clock pulse frequency with variations in horizontal linearity and timing, because the bit rate, and twice the bit rate, are quite distinct relative to the rate of deviation of the scanning beam from its assigned path, and can therefore be easily filtered out from the feedback control signal, thereby demodulating the latter.

A typical record produced by the apparatus of the type shown in FIGURE 1 and suitable for use with read-out apparatus of the type shown in FIGURE 4 is illustrated in FIGURE 6. This record designated 30A is seen to comprise a photographic film having a relatively opaque background coating 60 over most of its surface. Recorded on this film is a pattern of lines of double-pulse intelligence 61 with alternately extended ends 62 corresponding to the alternately extended ends of the graticule lines illustrated in FIGURE 2, and with connecting traces 63 joining the ends of consecutive lines of intelligence. The traces 63 are relatively transparent and the recorded intelligence bits 64 each include a region of opacity and a region of relative transparency. As indicated at 65 a region of transparency followed by one of opacity represents a binary one, while the opposite sequence, opacity followed by transparency, as indicated at 66, represents a binary zero.

Those skilled in the art will of course appreciate that the above arrangement will function equally well with a record having a transparent background and opaque connecting trace indications providing that the beam is controlled to clamp to the transparent lower edges of the intelligence lines on the record. In fact, those skilled in the art should appreciate that the record 30A shown in FIGURE 6 need not be a photographic film at all, and may actually consist of any record having a background condition of one kind together with a recorded pattern of intelligence and connecting traces as shown in FIGURE 6 including a contrasting record condition of another kind. Thus the contrasting conditions of the record could also be manifested by holes in the record, variations in record thickness, variations in electrical charge along a record, variations in magnetic coercion, and so forth, on a medium having a suitable conrtast background.

It should thus be understood by those skilled in the art to which this invention pertains that in lieu of photographic recording procedures, other recording procedures may be utilized, for example, electrostatic printing with light sensitive surfaces of selenium, zinc oxide films or the like.

It should also be understood that the beam scanning rates may be varied by altering the frequency of the master oscillator and the time constants of the line registration and raster position circuits, the time constants thereof being inversely proportional to the scanning rates.

While I have described the principles of my invention in connection with specific apparatus, it is to be clearly understood that this description is made only by way of example and not as a limitation to the scope of my invention as set forth in the accompanying claims.

I claim:

1. A data storage system comprising:

means for storing a dense pattern of binary pulse signals;

a scanning device;

means defining a predetermined scanning pattern relative to said storing means, including a series of parallel guide lines having alternately extended end portions, the lengths of which are large in relation to the length of a binary digit signal stored in said storing means;

means for causing said scanning device to scan said storing means at a predetermined rate in a coarse pattern roughly corresponding to said predetermined scanning pattern;

means effective during traverse of said scanning device over each of a series of scan lines corresponding to said parallel guide lines to transfer a train of binary pulse digit signals relative to said storing means, each digit signal element of said train including at least one pulse variation between two different predetermined signal conditions which is representative of the digit intelligence contained in said digit signal, said means being further effective to continuously transfer a particular one of said two signal conditions during the traverse of said scanning device between the ends of successive scan lines; and feedback control means responsive only to said particular one of said two signal conditions for controlling the scanning position of said scanning device to bring said coarse pattern into precise correspondence with said predetermined pattern, said feedback controlling means having a minimum response time which is long in relation to the duration of a digit signal but short in relation to the time required for said scanning member to pass between the ends of consecutive parallel lines in said pattern.

2. A data storage system comprising:

a light spot recording medium;

means for projecting a spot of light onto the surfaces of said medium;

means defining a predetermined pattern of movement for said projected spot of light, including a series of parallel lines with alternately extended end portions of predetermined length;

means for deflecting said spot of light at a predetermined rate in a coarse raster pattern roughly corresponding to said predetermined pattern;

means operated in rhythm with said deflecting means for transferring a train of binary digital pulse signals relative to said medium, in the form of cyclic double-pulse modulations of said spot, during each traverse of said deflected spot over a region corresponding to a line of said predetermined pattern, said transferred means being conditioned to transfer a constant signal during transitions of said deflected spot between ends of consecutive lines, each cycle of said double-pulse modulation having a predetermined period which is short in relation to the time required for said spot to traverse the predetermined distance from the end of a line in said raster pattern to the end of the extended end portion of the next consecutive line; and feedback circuit means, having a minimum response time characteristic which is long in relation to a cycle of said double pulse modulation but short in relation to the time required for said spot to travel between consecutive line ends, said feedback means being responsive to the output of said transferring means to control the deflection of said spot to bring said coarse raster pattern into precise coincidence with said predetermined pattern of lines, said feedback means being constantly responsive to only one condition of said double-pulse modulated spot, corresponding to said constant signal, due to said response time characteristic.

3. A data storage system comprising:

a cathode ray tube, having a surface of luminescent material, means for projecting an electron beam against said surface to produce a spot of light thereon, means for deflecting said beam in two perpendicular directions, and means for modulating the intensity of said beam;

an unexposed photographic film and a photoelectric light transducing element disposed in a light protected region;

means for simultaneously focusing the light from said tube surface into spots at the surface of said film and at the light sensitive input of said transducing element;

a transparent graticule, having a pattern of opaque ruled guide lens thereon, mounted so as to intercept the light passed by said focusing means to said film and transducing element;

means coupled to said beam deflecting means for deflecting said beam in a coarse linear raster pattern roughly corresponding to said pattern of ruled lines on said graticule;

means operating in rhythm with the deflection of said beam for applying binary digital pulse signal trains arranged in a double-pulse format to said beam intensity modulating means during a portion of each linear deflection of said beam; and feedback circuit means coupled between said light transducing element and said beam deflecting means for clamping said spot of light to said ruled graticule pattern, said feedback circuit means having a minimum response time characteristic which is long in relation to the duration of a signal bit in said intelligence signal trains, so that it responds only to one condition of the modulated light pulses impinging on said transducing element, and yet which is sufficiently short to prevent said beam from deviating excessively from the pattern defined by said graticule lines.

4. The system of claim 3 wherein:

said ruled graticule lines are unconnected parallel lines having alternately extended end portions of a predetermined length; and wherein said feedback means is effective to clamp said beam to follow the upper edges of said graticule lines during application of said binary digital intelligence signal modulation and to smoothly guide said beam to the upper edge of the extended end portion of the next consecutive graticule line during the remainder of each coarse deflection interval, thereby respectively recording patterns of double-pulse light and dark pulse elements along lines on said film corresponding to the graticule lines and recording a smooth connecting trace in the form of a light line on said film, between the end of each recorded line of intelligence and the extended end portion of the next successive line of intelligence on said film.

5. The system of claim 3 wherein said feedback circuit means includes an additional long-time constant circuit responsive only to long term changes in the light incident upon said transducing element to provide a corresponding varying bias signal for controlling said beam deflecting means to assure long term stabilization of said beam.

6. The system of claim 3 wherein:

said coarse raster deflecting means includes a source of periodic signals, having a serrated amplitude versus time waveform coarsely corresponding to said graticule pattern for cyclically deflecting said beam in the horizontal direction over a horizontal displacement distance corresponding approximately to the length of a graticule line plus the extended end portion of the next line, and a source of periodic sawtooth waveform signals having a predetermined time relation to said serrated horizontal deflection waveform, and having a period extending over a complete raster scan cycle, for deflecting said beam in the vertical direction through a predetermined increment of displacement for each cycle of horizontal deflection.

7. A data storage system comprising:

a storage medium;

a flying spot scanning system adapted to scan said medium in a coarse scanning pattern;

means defining a precise scanning pattern coarsely corresponding to said coarse pattern;

means for transferring binary digital pulse signals recurring at a predetermined minimum rate relative to said medium, said transferred signals being characterized in that each digit signal element includes at least two pulse signal conditions; and feedback circuit means responsive to a given one of said two signal conditions in said transferred signal to control said scanning system in accordance with the difference between the actual position of said flying spot and a corresponding position in said precise pattern, said means being insensitive to signal fluctuations recurring at a rate greater than or equal to said predetermined minimum rate, but sensitive to slower signal fluctuations accompanying departures of said flying spot from said precise pattern.

8. A data storage system comprising:

a cathode ray tube including means for projecting a luminescent spot on the face thereof, means for variably deflecting said spot in two mutually perpendicular directions, and means for modulating the illuminating intensity of said projected spot;

a transparent graticule having thereon a pattern of parallel opaque ruled lines with alternately extended end portions;

first means disposed intermediate said tube face and graticule for focusing the spot of light emanating from said tube face at a corresponding point on said graticule;

a photocell and an unexposed photographic film disposed in a light protected environment;

second means disposed between said graticule and said film and photocell for focusing light transmitted from said graticule into spots at both the sensitive surface of said photocell and at a point position on said film corresponding to the position of said spot on said tube face;

means coupled to said spot deflecting means for deflecting said spot in a coarse pattern roughly corresponding to the pattern of lines on said graticule, said deflection commencing at a point coarsely corresponding to the extended end of a first of said graticule lines and proceeding in sequence towards the opposite end of said line, thence toward the extended end of the next graticule line, back towards the opposite end of the next line, and so forth;

means coupled to said spot intensity modulating means and operative in rhythm with said course pattern deflecting means for modulating said spot on and off at a predetermined rate in accordance with each signal element in a train of pulse signal elements, during each transverse of said spot between the extended and opposite ends of a line in said coarse pattern, and for maintaining said spot in the on condition during the passage thereof from the said opposite end of each line to the extended end of the next line;

each said pulse signal element having a duration which is short in relation to the separation of consecutive lines in said pattern; and feedback circuit means coupled to said photocell for feeding back additional deflection control signals to said spot deflecting means to deflect said spot in accordance with departures of said spot from the upper edges of said graticule lines, so as to clamp said deflected spot to said upper edges during said coarse deflection thereof, said feedback means having a response time characteristic which is long in relation to the duration of a pulse signal element but short in relation to the time required for said deflected spot to travel from the said opposite end of a line to the extended end of the next line.

9. A system according to claim 8 including additional feedback circuit means in parallel with said first mentioned feedback circuit means, and having a response time characteristic which is long in relation to the response time of said first mentioned feedback means, for imposing bias signals tending to stabilize the long term position of said deflected spot relative to said graticule lines so that a constant intensity of illumination is supplied to said photocell.

10. A data storage system comprising:

a cathode ray tube including means projecting a luminescent spot on the face thereof, and means for variably deflecting said spot in two mutually perpendicular directions;

a photographic film having a developed pattern of intelligence thereon in the form of a series of parallel lines of uniformly spaced pulse signal elements each including a region of opacity and a region of transparency, said lines having alternately extended end portions, said film further having thereon a developed transparent connecting trace between the extended end portion of each said line and the unextended end of the preceding line, the length of said connecting trace being long in relation to the length of a pulse signal element on any line;

means disposed between said cathode ray tube and said film for focusing the line produced by said luminescent spot into a point on the surface of said film;

a photocell;

means disposed between said film and said photocell for projecting the light transmitted through said film onto the sensitive surface of said photocell;

means coupled to said spot deflecting means for applying a pattern of serrated waveform signals tending to deflect said spot in a serrated pattern corresponding to the pattern of intelligence lines and connecting traces on said film; and feedback circuit means coupled to said photocell for feeding back additional deflection control signals to said spot deflecting means to cause said spot to track the pattern of intelligence and connecting traces on said film, said feedback circuit means having a response time characteristic which is long in relation to the duration of a pulse signal element recorded on said film but short in relation to the time required for said deflected spot to travel between the unextended end of any line and the extended end of the next line in said pattern along said connecting trace.

11. A system according to claim 10 including additional feedback circuit means in parallel circuit relation with said first mentioned feedback circuit means, and having a response time characteristic which is long in relation to the response time of said first mentioned feedback means, for supplying bias control signals to said spot deflecting means for long term stabilization of the position of said deflecting spot relative to said pattern of lines and connecting traces on said film so that the average intensity of light transmitted through said film to said photocell is held constant.

References Cited by the Examiner

UNITED STATES PATENTS

| | | | |
|---|---|---|---|
| 2,540,016 | 1/51 | Sunstein | 340—173 X |
| 2,843,841 | 7/58 | King | 340—173 |

OTHER REFERENCES

Proceedings of the I.R.E., King et al., Photographic Techniques for Information Storage, October 1963, pp. 1421–28.

IRVING L. SRAGOW, *Primary Examiner.*